United States Patent [19]
Tatarchuk et al.

[11] Patent Number: 5,304,330
[45] Date of Patent: Apr. 19, 1994

[54] PREPARATION OF MIXED FIBER COMPOSITE STRUCTURES

[75] Inventors: Bruce J. Tatarchuk; Millard F. Rose; Gopal A. Krishnagopalan, all of Auburn, Ala.; John N. Zabasajja; David A. Kohler, both of Baton Rouge, La.

[73] Assignee: Auburn University, Auburn University, Ala.

[21] Appl. No.: 748,032

[22] Filed: Aug. 21, 1991

Related U.S. Application Data

[63] Continuation-in-part of Ser. No. 356,861, May 24, 1989, Pat. No. 5,080,963, and a continuation-in-part of Ser. No. 435,167, Nov. 13, 1989, Pat. No. 5,102,745.

[51] Int. Cl.⁵ .............................................. C04B 35/64
[52] U.S. Cl. .......................................... 264/61; 264/65; 264/104; 264/105; 264/122; 264/125; 264/DIG. 75
[58] Field of Search ................ 264/61, 104, 105, 122, 264/125, 65, 56, 59, 60, 29.4, 29.6, 29.2, 248, DIG. 75, 257; 428/288, 296, 605

[56] References Cited

U.S. PATENT DOCUMENTS

| | | | |
|---|---|---|---|
| 4,265,703 | 5/1981 | Terliska | 162/157.4 |
| 4,597,028 | 6/1986 | Yoshida et al. | 361/305 |
| 4,643,940 | 2/1987 | Shaw et al. | 428/308.4 |
| 4,670,214 | 6/1987 | Magnuson et al. | 264/60 |
| 4,882,227 | 11/1989 | Iwase et al. | 428/407 |
| 4,885,120 | 12/1989 | McQuillan et al. | 264/60 |
| 4,940,524 | 7/1990 | Perineau et al. | 428/367 |
| 4,990,490 | 2/1991 | Pathare et al. | 264/61 |
| 5,011,638 | 4/1991 | Pinkhasov | 264/59 |
| 5,076,898 | 12/1991 | Nidola et al. | 264/104 |
| 5,102,745 | 4/1992 | Tatarchuk et al. | 428/605 |
| 5,153,057 | 10/1992 | Corbett et al. | 264/59 |
| 5,158,828 | 10/1992 | Sudani et al. | 428/364 |
| 5,743,349 | 5/1988 | Bachot et al. | 204/242 |

*Primary Examiner*—Jay H. Woo
*Assistant Examiner*—Duane S. Smith
*Attorney, Agent, or Firm*—Eugene I. Snyder

[57] ABSTRACT

A new class of composites results from a matrix of fibers, such as fibers of carbon, alumina, ceramics, and aluminosilicates, interwined in a network of fused metal fibers. The composites can be fabricated to have varying surface area, void volume, and pore size while maintaining high electrical conductivity. Composites are readily prepared from a preform of a dispersion of the metal fibers, other fibers, and an organic binder such as cellulose, by heating the preform at a temperature sufficient to fuse the metal fibers and to volatilize at least 90% of the binder. Where a carbon fiber is used, the metal fibers are fused at a temperature causing a loss of less than about 25%, and usually under 15%, by weight of carbon fiber.

29 Claims, 11 Drawing Sheets

PREPARATION OF MIXED FIBER COMPOSITE STRUCTURES

ACKNOWLEDGMENTS

This work was funded by Auburn University and the Space Power Institute as funded by the SDIO Innovative Science and Technology Office and the Defense Nuclear Agency under DNA contract no. 001-85-C-0183.

CROSS REFERENCE TO RELATED APPLICATIONS

This application is a continuation-in-part of my co-pending applications, Ser. No. 07/356,861, filed May 24, 1989 now U.S. Pat. No. 5,580,963, and Ser. No. 07/435,167, filed Nov. 13, 1989 now U.S. Pat. No. 5,702,745, all of which are hereby incorporated by reference.

BACKGROUND OF THE INVENTION

This application relates to novel composites having high surface area, variable porosity and void volume, good conductivity, and displaying chemical stability in corrosive environments. The composites have mechanical and structural integrity and can be prepared in virtually an endless variety of shapes. For the sake of simplicity and clarity of exposition, the composites which are our invention will be discussed from the aspect of their use as electrode materials. However important this particular application may be, it needs to be stressed at the outset that the claimed composites have significant utility outside the field of electrochemistry, but such uses are omitted here only for convenience.

Carbon based electrodes are currently used in many high energy density and/or high power density applications, such as $Li/SOCl_2$ batteries, liquid double layer capacitors, and fuel cells. The maximum energy and power densities obtainable from these devices depend upon various physicochemical rate phenomena occurring at the electrode-electrolyete interface. For example, in the case of high energy density lithium/thionyl chloride batteries, deactivation of the carbon cathode limits operation of the battery at high ($>10$ mA/cm$^2$) discharge rates. Since deactivation arises from the preferential precipitation of solid reaction products at the exterior of the cathode, thereby blocking its interior surface area from participating in the reaction, the power density of the battery during discharge is limited by the porosity, the void volume, and the active or accessible surface area of the carbon cathode.

When the cathode becomes blocked, as described above, the interfacial electrochemical reaction of the anode becomes limited by the dissolution rate of the reaction products into the electrolyte, which in turn is controlled by the precipitation rate at the cathode. Attempts to improve the fabrication and design of the carbon cathode has had limited success. Much of this activity has involved the addition of metallic elements such as copper to the carbon or the coating of the cathodes with transition metal phthalocyanines. Other efforts have utilized various carbon pretreatment procedures or different types of carbon blacks with various physical properties. However, past attempts appear not to address the intrinsic problem associated with carbon blacks, viz., the inaccessibility of small pores within the microstructure of the material and the existence of low void volumes in the outermost layers of the carbon. To provide high power density cathodes what is needed are materials which are flexible, have high specific surface areas, have varying and adjustable porosities and void volumes to accommodate reaction products as precipitates without significant loss of surface area, and which are corrosion resistant.

In liquid double layer capacitors the energy density increases with increased active surface area of the electrode presented to the electrolyte, whereas the power density is controlled and limited by slow diffusion of electrolyte through the microporous electrode material. To increase both the energy and power density of these capacitors requires increased diffusion processes, which prefer large pores and high void volumes, and higher levels of specific surface area, which entails small pore sizes and low void volumes. To date the requirements of large pores/high void volume and high surface area tend to be mutually exculsive. Consequently, since increased energy density involves increased surface area and increased porosity, power dense devices become more and more limited by diffusion processes as the surface area of the electrode is increased.

In fuel cells, an effective electrode material should exhibit high catalytic activity and high electrical conductivity to minimize joule losses within the device. The electrode should be highly porous to provide free access to both the gases and the electrolytes. The optimum pore size distribution of the electrode material is a compromise between several factors. For high strength, low porosity and small pores are desirable. For low polarization, large pores with maximum internal surface area are more desirable. Electrodes also contain metals such as platinum, nickel, and so forth, which are good catalysts for fuel oxidation and oxidant reduction. The catalytic activity depends on the active surface area of electrode as well as the contacting of the electrode with reactants consisting of fuel and electrolyte. For this reason, controlled wetting of the electrode poses one of the more severe design limitations confronting the device in order to provide optimal contacting at the gas-liquid-catalyst interface in the absence of weeping, bubbling, and flooding.

Carbon is an especially attractive electrode material, and high surface area carbon electrodes typically are fabricated from activated carbon blacks. However, a major difficulty in fabricating and utilizing high surface area carbon electrodes has been in physically supporting the carbon. Carbon black usually is used in the powdered form which cannot be easily supported unless poly(tetrafluoroethylene) (PTFE) or other types of binders are used. Our radically different approach has been to combine dissimilar and normally incompatible materials to form a physically stable composite structure which exhibits properties intermediate to the constituent materials. In the context of carbon electrodes, the resulting materials have a high surface area, variable porosity and variable void volume, are structurally stable, and can be fabricated in a virtually endless variety of shapes and sizes. More particularly, high surface area carbon fibers and highly conductive metal fibers have been combined in an intertwined sinter-locked network or grid which is structurally stable. The resultant high surface area and conductive composite allows high accessibility to gases and electrolytes while providing adjustable porosities and void volumes. Interlocked networks of thin fibers can be bonded to metallic backings, serving as current collectors and bipolar electrolyte separators, to provide flexible electrode structures which can be readily assembled into devices even when one of the components is relatively brittle or does not normally bond or adhere to the metal backing.

A generic approach to high surface area has been to disperse carbon blacks in an organic resin which serves as a mechanical framework. Solomon in U.S. Pat. No. 4,500,647 exemplifies one approach by using a matrix of carbon particles within an unsintered (i.e., unfused) network of carbon black-filamentary PTFE. The use of PTFE as a matrix for carbon particles has been investigated extensively. However, the addition of PTFE reduces the electrical conductivity of the cathode active layer (Solomon et al. in U.S. Pat. Nos. 4,500,647, 4,518,705, 4,456,521) and the cost of using PTFE has led others to seek alternative means of holding the carbon black together (Aubrey D. Smith, National Technical Information Service Technical Note, Report Date-Feb. 1986, 1 page, NTN86-0166).

A somewhat different approach employs carbon particles in a carbonized matrix. For example, Christner et al. (U.S. Pat. No. 4,115,528) prepared a porous carbon sheet by coating carbon fibers with furfuryl alcohol and a catalyst effective for its polymerization. The mixture was formed into a mat, heated to effect polymerization, and the resin then was further heated to carbonize the resin. The patentee in U.S. Pat. No. 4,506,028 dispersed carbon fibers in an organic binder containing organic poreforming granules, then heated the mix to carbonize the binder and volatilize the poreformers. In both of the foregoing the carbonized matrix supplies structure (i.e., rigidity and mechanical strength), whereas in our composites structure is afforded by a grid of fused metal fibers.

Zuckerbrod et al. in U.S. Pat. No. 4,448,856 describes an electrode with a layer of paste consisting of carbon particles, stainless steel particles, a fluorinated polymeric binder, and a catalyst for decomposition of peroxides. It is noteworthy that such a paste must contain at least 20 weight percent stainless steel relative to carbon particles. Finally, Watanabe and coworkers, [*J. Electrochem. Soc: Electrochemical Science and Technology,* 134, 1318 (1987)] used polyethylene glycol as a binder for carbon blacks, then pressed a film of the resulting material on nickel wire for use as a cathode in a lithium cell. It may be mentioned in passing that electrochemical electrodes have been described in U.S. Pat. No. 3,905,831 consisting of a pile fabric where a portion of the yarn is metallic. The patentees mention that the metal fibers in the yarn may be bonded, as by sintering, brazing or welding.

However useful and significant the carbon fiber-metal fiber network previously referred to may be, it seems to us that it is but one example of a class of composites with a range of uses transcending those of electrochemical applications and encompassing such diverse areas as cellular supports in biochemical reactors, magnetic separators, and filters; a short exposition of some of these uses is deferred to a later section. As to the composites themselves, it appears to us that one can specify their lowest common denominator, that is, those irreducible features which are necessary and sufficient to impart to the class of our composites those characteristics which make the class desirable from a materials point of view. A necessary feature is that the composite be a network of at least two different fibers. The fibers could be chemically different, for example, a metal fiber and a carbon fiber, or they could be physically different, for example, two fibers of the same metal but with different cross-sectional dimensions, length, or aspect ratio. The second and only other necessary feature is that there be a number of points in the network where the fibers are physically connected, i.e., bonded. There is versatility and variability here, too, such as the relative number of bonded points, whether fibers "interbond" (i.e., bonding between dissimilar fibers), whether they only "intrabond" (i.e., bonding between similar fibers), and if there is intrabonding whether all classes of fibers so bond or whether only, say, one kind of fiber bonds. The resultant composite is then a network of at least a first and a second fiber where the second fiber is interlocked in the network of bonded (i.e., physically connected) first fibers.

A pictorial, somewhat fanciful, and certainly non-literal overview of our invention is depicted in FIG. 1. The left hand region, designated by A, represents a physical mixture of two kinds of fibers as shown by the open and dotted strands. The case where only one of these fibers is intrabonded is depicted by B, that where both kinds of fibers are intrabonded is depicted by C, and that where the fibers are interbonded is depicted by D. The relative amounts of the two fibers will quite obviously influence the void volume of the composite. The density of bonded points will affect structural flexibility and, where the bonded fibers are electrically conducting, the conductivity of the composite. Where one fiber is non-porous, the relative number of the two fibers will determine the porosity of the composite. In short, from this oversimplified pictorial representation one can easily see how the final properties of the composite can be varied and one can appreciate that the properties of the composite can be a blend of the properties of dissimilar, normally incompatible materials—that is, the properties of the composite are themselves a composite of the properties of the materials forming the network. This attribute can not be stressed too highly since it is, if not unique, rarely found, difficult to achieve, and highly desirable for new materials.

SUMMARY OF THE INVENTION

The purpose of our invention is to provide as new materials composites formed from dissimilar fibers, composites whose physicochemical characteristics may be the resultant of the physicochemical characteristics of the dissimilar fibers present, whose physicochemical characteristics can be varied, and whose properties are under the control of the fabricator. More particularly, the purpose of the invention to be described within is the preparation of such composites. An embodiment comprises dispersing a first fiber, at least one second fiber, and a structure forming agent in a liquid, casting the dispersion into a preform, and treating the cast dispersion to effect bonding of at least the first fibers at a plurality of their junctions. In a more specific embodiment the structure forming agent is a cellulose. In a still more specific embodiment the cast dispersion is heated to sinter-lock at least the first fibers and to volatilize at least 90% by weight of the structure forming agent. In yet another embodiment the first fibers are metals and the structure forming agent is cellulose. Other purposes and embodiments will be apparent from the description which follows.

DESCRIPTION OF THE INVENTION

Figure 1A:
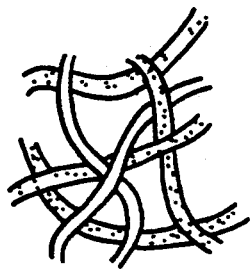
FIGS. 1A–D are a pictorial and non-literal overview of the invention.
Figure 1D:
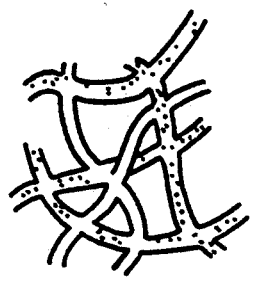
Figure 1C:
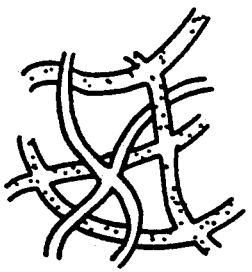
Figure 1B:
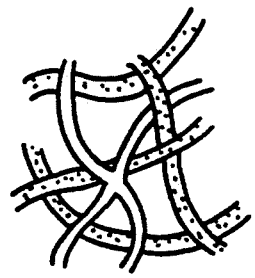

We have found a generalized method of making composite articles which is enormously versatile both with respect to the materials of the resulting composite as well as the shape of the resulting article. Our method bonds fibers at a plurality of their junctions in a fibrous network, which inter alia has the effect of imparting high strength and structural integrity to the fibrous network and to afford good electrical contact when one of the fibers is a metal or another type of conductive, or conductively coated, material. One result of our method is that it is possible to combine dissimilar materials with dissimilar properties where the materials and properties often are considered incompatible or mutually exclusive, and to obtain an article having mutually beneficial properties characteristic of each of the dissimilar materials.

Because of the broad operability of our method when applied to a wide spectrum of materials, we have examined the resulting articles of manufacture as to their properties, as to their several uses, and as to the variants which can be expected based on our experience. In one aspect, then, our invention is a generalized method of making articles, and especially shaped articles, containing at least two kinds of fibers bonded in a network. The lowest common denominator of these articles, that is, the feature which is common to each of them, is a network of at least two classes of fibers where the fibers from at least one of the classes are bonded at a multiplicity of junctions within the network and the fibers from the other classes are interlocked in the network of bonded fibers. This theme will be elaborated upon in greater detail below.

We use the term "network" in the usual dictionary definition, i.e., a structure of [cords or wires] that cross at regular intervals and are knotted or secured at the crossing. See Webster's Seventh New Collegiate Dictionary, G. and C. Merriam Co., (1970), p. 568. We note that the networks of our invention are two dimensional in the sense that the flat-shaped article has a thickness which is often small relative to the other lateral dimensions. However, the diameter of the largest size fiber also will be small relative to the thickness of the article, which means that the articles of our invention are not composed of a monolayer of fibers but instead are composed of multiple layers of discrete fibers. In the context of the definition of a network, the crossing points of the fibers may be in different planes, and it follows that the fibers will not be in contact at all crossing points. In this application "junctions" refers to the crossing points in the network where fibers are in contact or caused to come into contact.

One can readily exemplify and illustrate some important properties of our composites in the sphere of electrodes where often it is desired that materials have a high surface area, high void volume, and high electrical conductivity. Although it is not necessary that all three attributes be manifested simultaneously in every physical device utilizing an electrode, it would be quite desirable to have an electrode material which not only permits variability in these properties, but also affords the option of preparing an electrode with that set of properties optimum for a particular application. Properties such as high surface area and high electrical conductivity tend to be mutually exclusive. This situation arises because, for example, carbon has a low density (relatively high surface area) and modest conductivity whereas metals have a high density (relatively low surface area) accompanied by a generally high conductivity. Consequently, the properties of prior art materials, and in particular the mutual exclusivity of two of the three properties given above, restrict the set of simultaneously attainable properties available and preclude the option of complete design manipulation.

Conceptually a marriage of carbon and metals might result in a composite with the best features of both. However, carbon blacks and metals do not form strongly adhesive bonding arrangements with each other and possess quite different densities and tensile properties. Consequently they do not mix well when dry nor provide good adherence to metal substrates under normal conditions. As previously stated, our goal has been to combine dissimilar and normally incompatible materials to form a physically stable composite structure which exhibits properties that are intermediate to the constituent material. This goal is achieved successfully in composites which are a matrix of carbon fibers intertwined and interlocked in a network of fused metal fibers.

As previously stated, the feature common to all articles of our invention is a network of at least two classes of fibers where at least one class is bonded at a plurality of their junctions and the fibers from the other classes are interlocked in the network of bonded fibers. By "bonded" is meant that the fibers are physically connected, either directly or via a link or bridge between the fibers. In particular, "bonded" does not include mere physical contact of two fibers but rather requires some sort of permanent union or "gluing together" of the fibers; bonded fibers are securely connected, locked together. Note also that two fibers can be bonded without their being in direct physical contact, but with indirect contact provided by a link or bridge between them. Whether only the first fibers are bonded at their junctions or whether both the first and the second fibers are bonded at their junctions depends on the materials of the article, the bonding method, and the bonding conditions. Similarly, the question whether the first and second fibers are bonded to each other also depends on the fibrous materials, the bonding method, and bonding conditions. For example, where both the first and second fibers are of the same metal, then generally both the first fibers will be bonded to each other at their junctions and the second fibers will be bonded to each other at their junctions, as well as the first and second fibers being bonded to each other at their junctions. Where, for example, the second fiber is a metal which is dissimilar from that of the first fiber, and where the bonding method is sintering, then the question of whether the second fiber will be bonded at its junctions will be dependent upon sintering temperature and sintering time as well as the particular metal constituting the second fiber. Similar considerations apply to the question whether the first and second fibers will be bonded at their junctions. In contrast, where the first fiber is a metal and the second fiber is, for example, a ceramic, the kind of bonding will be quite dependent upon the particular bonding method and bonding conditions. So, for example, where heating is the bonding method then at sufficiently high temperatures to sinter both the metal and the ceramic the first fiber will be bonded at its junctions and the second fiber bonded at its junctions, but generally there will be no bonding at the junctions of the metal and the ceramic.

On the other hand, where the first fiber is a metal and the second fiber a nonmetal, if electroplating is the bonding method and if the second fiber can be electroplated under the conditions employed, then there would be bonding at all junctions. Where only the metal is electroplated under the conditions used then only the junctions of the first fiber will be bonded. For example, electrodeposition of nickel onto or into the metal fibers in a network of 2 micron diameter stainless steel and 2 micron diameter carbon fibers causes a physical enlargement of the metal fiber diameters which leads to an increase in the electrical and physical contact between carbon and metal by greater than 30%. Such a procedure provides one example whereby bonding between dissimilar materials can be enhanced for desired electrical properties or other favorable mechanical attributes. In any event, the question of what junctions are bonded generally can be answered from a knowledge of the materials used, the bonding method and bonding conditions employed, and, in appropriate cases, through further simple experimentation.

Among the bonding methods which may be used in the practice of our invention are included heat, electroplating, chemical bond formation, chemical vapor deposition, plasma spraying, thermosetting, dipping and drying in a solution of an organic binder (i.e., structure forming agent; vide infra) and solvent application of pressure to a mixed composite fiber network which flows, melds, creeps, etc., or any other procedure which causes physical attachment of all, or various types of selected, fibers within the network.

Heating may cause similar or dissimilar metals or ceramics to sinter via the atomistic diffusion of surface atoms so as to form solder-like joints which provide good electrical and/or mechanical contact. Alternatively, heating may cause dissimilar metals and materials to overcome diffusive or reactive energy barriers permitting surfaces of metalized or polymer-coated fibers to bond at conditions different, or significantly less severe, than those otherwise required to bond the base materials. The thermosetting properties of polymeric or noncrystalline materials may also be used to fuse these materials during an appropriate heat treatment with the simultaneous application of an applied pressure force.

Electrodeposition of a metal (electroplating) into or onto the mixed fiber composite provides a mechanism for growing or thickening and strengthening contacts which are present or formed between electrically conductive materials onto which the metal is deposited. It also provides a mechanism for increasing the electrical conductivity of the matrix, and, as noted earlier, conductor "swelling" during electrodeposition can increase the contact between conductive and nonconductive fiber materials. Alternatively, electroplating via electroless deposition from a metal salt and a suitable organic reducing agent can be used as an indiscriminate bonding procedure which is operative regardless of the base electrical conductivity of the material coated (e.g., aqueous silver nitrate plus formaldehyde produces a colloidal suspension of reduced metal which bonds via precipitation and forms adherent metallic films on various substrates).

Chemical vapor deposition and reactive plasma spraying provide well-documented means of growing thin-films and coatings which have the ability to coat, in a relatively uniform manner regardless of geometry, various articles despite their dissimilar electrical or mechanical properties. These procedures therefore have the ability to bond similar or dissimilar materials which are in relatively close proximity. Since the embodiment of this invention many times involves mixtures of microscopic fibers in intimate contact, the growth of a secondary deposit via, e.g., chemical vapor deposition, can cause physical attachment of fibrous materials at locations which had previously been in close proximity but not in direct physical contact. This is an example where two fibers are bonded via a bridge between them.

Dipping a composite fiber matrix in a solvated organic binder or resin can cause attachment of similar and dissimilar fibers when the solvent is removed by gradual drying and the binder is concentrated via surface tension effects at the interstices and intersections of the fibers (e.g., polyvinyl alcohol in water). Subsequent drying leads to the physical attachment of the fibers and high temperature carbonization or graphitization of the organic can be performed to make the interconnecting material electrically conductive. Alternatively, a solvated inorganic metal salt also can be deposited upon drying at the intersections of the fibers with this material being subsequently reduced to produce a conductive coating and physical attachment.

Still another method of attachment might involve an ambient temperature attachment of fibers through the application of pressure exceeding that required to cause the material to flow via plastic deformation. Such a process could be performed and/or facilitated via the addition of an organic fiber or through the use of a combined heat and pressure treatment.

In those cases where the first fiber is either a metal or a ceramic, heating can be used effectively to sinter-fuse the fibers at their junctions. The sintering temperature and sintering times will vary greatly depending upon the nature of the materials to be fused as well as the nature of the second fiber, but these generally can be determined either via simple experimentation or through knowledge of the activation energy of the various processes which occur during sintering. For example, in the case where the first fiber is stainless steel and the second fiber is carbon and the sintering is done in the presence of hydrogen, then the competing reactions are fusion of the stainless steel and vaporization of carbon through reaction with hydrogen, especially if catalyzed by the metal. Experimentation has shown that the activation energy of the latter process is substantially less than that of the former. In addition, the latter process is dependent on hydrogen pressure. Therefore, the selectivity of sinter fusing the stainless steel at its junctions may be optimized by heating under low hydrogen partial pressure at relatively high temperatures for relatively short times.

The particular bonding method as well as the conditions of bonding will understandably depend upon the nature of the fiber materials in the composite as well as its intended use. For example, where the first fiber is a metal and the composite is intended for use as an electrode, where good electrical contact between the metal fibers is required, it is found that bonding via sintering is quite effective. However, it also has been found that bonding at the junctions is further improved by electroplating. The message we wish to convey is that however significant may be the bonding method in the general practice of our invention, the choice of the particular bonding method used necessarily depends upon the nature of the fibers in the composite as well as the intended use of the composite.

Perhaps the most important subclass of composites is that where the first fiber is a metal. Virtually any metal fiber may be used in the practice of our invention, although generally the metal must be chemically inert under the conditions of the contemplated use of the composite and also generally must provide structural integrity, strength, and mechanical stability to the final composite under the contemplated conditions of use. For example, the final composite generally needs to retain its overall shape and to remain relatively rigid and immobile in most uses. However, where the final composite needs to retain some flexibility in its operating environment then materials need to be chosen which will impart such properties. Illustrative but not exhaustive examples of metal fibers which may be used in the practice of this invention include aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, gallium, and combinations of the above. Metal alloys also may be used in the practice of this invention, as exemplified by constantin, hastelloy, nichrome, inconel, monel, carpenter's metal, and various steels, especially stainless steels, and other alloys. As can be appreciated, there is enormous flexibility in the choice of metal fibers which adds to the attractiveness of our invention.

The diameter of the metal fibers used is largely dictated by their availability. Although in principle there is no upper or lower limit to metal fiber diameter, there may be operational restrictions in those cases where the second fiber is a non-metal which is held together by the fused metal network. For example, if the second fiber is a carbon fiber which is randomly intertwined among fused metal fibers, then if the metal fiber diameter is greater than ten times, or less than one-tenth, the carbon fiber diameter the fused metal network may not hold the carbon fibers together adequately. But in the more general case the ratio of diameters of a metal first fiber to second fiber may range from as high as 1000 to as low as 0.001, depending upon the nature of the fibers, their density, and the intended use of the article, inter alia. Another operational limitation may be related to the number of bonded junctions which are largely responsible for supporting, for example, the carbon fibers in the aforementioned composite. Calculations show that the number of such junctions varies approximately with the inverse of the square of the metal fiber diameter, hence there is a requirement for small diameter metal fibers where it is desirable to increase the overall weight fraction of carbon or the other second fiber of the resulting composite. But in the context of novel composites per se, the diameter of the metal fiber used is not critical. The method of preparation and attainment of the composite is not limited by metal fiber diameter, at least up to about 50 microns. Metal fibers with diameters as low as about 0.5 microns and with diameters up to at least 25 microns have been used quite successfully in the practice of our invention. It needs to be emphasized that the aforementioned range is merely illustrative of the success which is to be contemplated and is more representative of metal fiber availability rather than being a limitation on the diameter of metal fibers.

Where the first fiber is a metal, the second fiber may be a metal, a ceramic, carbon, a high surface area material, or any combination of the above. One important subclass of composites results from the second fiber being a metal. The metals which may be employed for the second fiber constitute the same group of metals as may be used for the first fiber as given above and need not be repeated here. The second fiber may be a metal which is the same as or different from that of the first fiber; that is, where the second fiber is a metal it is independently selected from the same group of metals from which the first fiber is chosen. Often the second fiber as a metal will be distinguished by having a diameter different from that of the first fiber. More particularly, relatively large diameter fibers in a network impart strength and structural integrity to the composites. On the other hand, a small diameter second fiber may be chosen to adjust the void volume and porosity of the resulting composite. Where the two metals used are of quite different diameter, it has the effect of constructing a small mesh network on a large mesh framework, which has been found to be a very useful structure. The second fiber may have a diameter ranging anywhere from about 0.001 that of the first fiber to 1000 times that of the first fiber. The second fiber may be present at a weight ratio of from about 0.001 to about 100 that of the first fiber. It should be clear that adjustment of both the weight ratio as well as the diameter of the second fiber enables one to control the porosity and void volume of the resulting composite almost without limitation and essentially continuously and enables one to fabricate articles customized for their intended use. The ratio of fiber length to fiber diameter, or aspect ratio, is yet another independent variable, and in the variant where both the first and second fibers are metals the aspect ratio of the second fiber can range between about 10 and about 10,000.

As mentioned previously, where the composite is to be used as, for example, an electrode and good electrical contact among the fibers is paramount, then the fibers may be electroplated to enhance such contact. This may be done both in cases where the first and second fibers are metals, as well as in those cases where the second fiber is not a metal, whether or not the second fiber is a conductor such as carbon.

Another important class of composites is that where the second fiber is not a metal but a high surface area material. Even though the minimum surface area needed is 1.5 $m^2/g$, it is desirable that such second fibers have a surface area of at least 50 square meters per gram ($m^2/g$), although materials with a surface area greater than about 100 $m^2/g$ are preferred, and those with a surface area greater than 250 $m^2/g$ are particularly preferred. Although there may be no theoretical maximum of surface area which may be employed in the practice of our invention, as a practical matter fibers with surface area over 1500 $m^2/g$ are difficult, if not impossible, to obtain. Among such high surface area materials available as fibers are included carbon, silica, magnesia, alumina, clays, titania, aluminosilicates, silicaaluminophosphates, aluminophosphates, and so forth.

A particularly important subclass of composites of this invention is a matrix of carbon fibers interlocked in and intertwined among a network of fused metal fibers. Although it should be apparent that "carbon" in the phrase "carbon fibers" includes and encompasses graphite, we here specifically note that in the context of the remainder of this specification and in the claims "carbon fibers" includes graphitic material. The carbon fibers constitute from about 1 to about 98 weight percent of the final composite, although the range between about 20 to about 98 weight percent is preferred. There is no significant upper or lower limit for the diameter of the carbon fibers as regards forming the composite itself. That is, the diameter of the carbon fibers used in the composite influences its final properties rather than imposing limitations on whether the composite itself can be made. Carbon fibers have been reported with a surface area from about 1500 $m^2/g$ to 1 $m^2/g$ and less, and with a diameter from 20 nm to about 1 mm. As an example, and as will become clearer from the descriptions within, for use in liquid double layer capacitors, $H_2/H_3PO_4/O_2$ fuel cells, and $Li/SOCl_2$ batteries, carbon fibers having a surface area of from 250 $m^2/g$ to about 1000 $m^2/g$ are most desirable with fibers having a diameter from 1 to about 10 microns, with a carbon content of the composite ranging from 30 to about 90 weight percent.

The carbon fibers generally are present as bundles. Single fibers tend to be brittle, whereas bundles or aggregates of fibers afford a composite with more desirable mechanical properties. As the diameter of the carbon bundles increases, the weight of metal fibers needed to keep the bundles intertwined and interlocked is decreased. The physical properties of the final composite also depend on the physical properties of the carbon fibers used; thermal stability, surface area, mean pore diameter, mechanical flexibility, resistance to electrolytes and acids, and electrocatalytic properties are examples of composite properties which are influenced by the properties of the constituent carbon fibers and any electroactive materials impregnated on the fibers. It should be emphasized that the surface area of the carbon fibers used largely determines the surface area of the final composite. Since different applications require different characteristics, the choice of carbon fiber properties often will be dictated by composite application. For example, where used in double layer capacitors one generally wants a certain minimum pore size, which in turn limits the surface area. In batteries mass transfer is more important and one wants a higher void volume, preferably with a bimodal pore size distribution. A graded porosity also is possible to attain using this invention and may be important in particular applications. However, what needs to be emphasized is that many of the composite properties are not only variable but are under the control of the investigator or fabricator within quite broad and flexible limits.

Where the composites are carbon fibers intertwined among, and interlocked in, a network of bonded metal fibers, the metal fibers which may be used in the practice of this invention must be chemically inert under the conditions of their contemplated use, and must provide structural integrity and mechanical stability to the final composite under the contemplated conditions of use. So, for example, the final composite generally needs to retain its overall shape, and the metal of the composite serves to retain the carbon fibers in the network relatively rigid and immobile. Where the composite is used, e.g., in an electrode, the metal also must be electrically conducting and its network must provide structural and mechanical stability even in strong, electric fields. Because of their general availability and relatively modest cost, as well as favorable physical and chemical properties, various stainless steels are the materials of choice, especially in many electrode applications.

As previously stated, the method of preparation and attainment of carbon fiber -metal fiber composites is not limited by metal fiber diameter, at least up to about 50 microns. In the context of the composite properties, however, the diameter of the metal fiber is important. In practice it is desirable to have metal fibers with a diameter under about 10 microns. It would be most desirable to use metal fibers with a diameter in the range from about 0.5 microns to about 4 microns, but it needs to be emphasized again that the nature and diameter of the metal fibers used in the practice of this invention are limited largely by their availability rather than by any theoretical considerations.

The amount of metal in the final carbon fiber-metal fiber composite depends on how much surface area per gram is important, and, perhaps even more importantly, how good a contact is desired between the metal and the carbon fibers. It should be clear that the better the contact wanted, the higher the necessary percentage of metal fiber (at constant fiber diameter) in the final composite. Generally the composites of this invention will have a metal content ranging from about 2 up to about 99 weight percent. As metal content increases, the composite shows reduced resistance and higher power density per gram with a lower surface area and lower energy density per gram.

In yet another important group of composites the second fiber is a ceramic material. For the purpose of this application a ceramic material is an oxide, nitride, or carbide of metals such as aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, gallium, and their mixtures. Illustrative examples of ceramics which may be used in our invention include silica, alumina, silica-aluminas, boron nitride, boron carbide, silicon nitride, silicon carbide, titanium nitride, titanium carbide, titanium boride, zirconium nitride, zirconium carbide, niobium carbide, niobium nitride, molybdenum nitride, molybdenum carbide, tungsten carbide, tantalum carbide, and so forth. In that variant of our invention where the second fiber is porous, for example, a high surface area material such as carbon, alumina, or silica fibers, or some other porous material including ceramics, it then may be impregnated with a metal or a metal compound, especially one with catalytic properties for at least one chemical process. This variant is especially suitable where the second fiber has a relatively high surface area, as mentioned above, and normally will be practiced in that mode.

As previously stated, any metal which exhibits suitable catalytic properties may be used and are illustrated by metals such as aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berylium, iridium, silicon, magnesium, manganese, and gallium, as well as their carbides, oxides, sulfides, nitrides, and combinations thereof. The porous second fiber may be impregnated by the metal or metal compound by any means known in the art. Such methods of impregnation include electrochemical precipitation, infiltration and drying, incipient wetness and drying, ion exchange, gas adsorption, liquid absorption, and vapor deposition. Methods of deposition are well known to those skilled in the catalytic art and need not be further elaborated upon.

The composites of our invention can be made by a relatively straightforward, uncomplicated method generally applicable to many types of materials. The fibers, and other components where present, are dispersed in a fluid medium along with an agent which we will refer to as a structure forming agent. The resulting dispersion is then cast into a predetermined shape and the cast dispersion is treated according to the various bonding methods discussed earlier so as to effect bonding of at least the first fibers at a plurality of their junctions. Much, and often substantially all, of the structure forming agent is then removed, often coincident with whatever procedure is used to effect bonding, but sometimes done sequentially, especially when the bonding procedure is followed by chemical or electrochemical leaching of the structure forming agent or pore former. As examples, residual materials can be removed through the use of an appropriate and selective etching organic acid; cores of electroplated carbon fibers can be removed via thermal oxidation, plasma oxidation, etc.; a ceramic particulate or void former can be preferentially removed by an appropriate caustic. Our method is extraordinarily flexible and broadly applicable as to the kinds of fibers which may be used in its practice. It also exhibits virtual universality as to the resulting shape of the finished article, and in fact net-shaped or near net-shaped articles may be readily made. The method also manifests some versatility as to bonding methods, which affords great flexibility in processing procedures and thereby the types of materials which may be used.

The fibers which may be used in this invention already have been adequately discussed, obviating the need for further description. These fibers are dispersed in a fluid medium along with other, optional solid and-/or liquid components. These optional components are functionally significant in the final composite, becoming entrapped and enmeshed in the network, and occupying what otherwise would be the voids in the resulting composite. Examples of solid particulate components which may be used in the practice of this invention include zeolites, particulate catalysts generally, adsorbents, ceramics, and combinations thereof.

The fibers and other components, if any, are dispersed in a liquid by any suitable means. It is not essential to have a uniform dispersion, although often such uniformity is desirable. Dispersion may be effected by such means as sonication, agitation, ball milling, and so forth. The purpose of the liquid is merely to facilitate effective dispersion of the solids, especially where one wants as uniform a dispersion as is feasible in the final preform. Normally the liquid used will be unreactive with the other components of the dispersion, but one can envisage special cases where a functionally desirable reactive property of the medium may be advantageously combined with its fluidity. Since the liquid is later removed it is clear that it should be readily removable, as by volatilization. Water is normally a quite suitable liquid, although water-alcohol mixtures, and especially water-glycol mixtures, may be used. Illustrative examples of other liquids include methanol, ethanol, propanol, ethylene glycol, propylene glycol, butylene glycol, poly(ethylene glycol)(s), poly(propylene glycol)(s), and so forth. Other organic liquids also may be used, but normally without any advantages. Since water is by far the most economical and most universally available liquid it is the one of choice in the practice of our invention. The liquid medium also may contain salts where these are desirable, and the greater solubility of salts in water relative to organic media also make the use of water highly advantageous. While some mixtures of the above noted liquids are used to adjust the viscosity of the dispersion so that filtering or settling onto a screen or filter provides a certain degree of uniformity within the "wet" preform regardless of the densities and drag forces acting on the various particulates, still other additives including surfactants and dispersing agents can be used to assist in the mixing process and also to preferentially associate at least two of the solids with one another in the preform.

A preform is the solid containing a non-woven dispersion of the fibers and any other optional components either in the structure forming agent or located upon or within the pore volume of one or more of the fibers. The structure forming agent provides a solid matrix in which the fibers and optional components are dispersed. The purpose of the structure forming agent is to permit the fabrication of a solid preform of an otherwise structurally unstable dispersion of the elements of the final composite where the preform can be shaped, stored, and otherwise handled prior to creation of an interlocked network via bonding of at least the first fibers at their junctions. The structure forming agent merely provides a stable, although relatively weak, physical structure which maintains the spatial relationship of the components of the final composite prior to the latter's formation. Although the preform is only a temporary structure, it is an important one in the fabrication of the final composite. The structure forming agents used in the preparation of the preform also may contain adjuncts such as pore and void formers.

A short comment on terminology may be in order. What we have called "structure forming agent" is usually referred to as a "binder" in other contexts. However more descriptive and more familiar "binder" and "binding agent" may be, these terms might be confused with the particular notion of "bonding" essential to the description of this invention. It is solely to avoid such confusion that we adopt the somewhat awkward term "structure forming agent."

The structure forming agents are chosen to volatilize at least to the extent of 90 weight percent, more often to at least 95% and frequently to at least 99 weight percent, under conditions which are neither chemically nor physically detrimental to the fibers and other components in the final composite (but vide infra). Where the structure forming agent has no function in the composite which is the rule rather than the exception, its presence can be minimal. Among the structure forming agents which may be used in the practice of this invention are cellulose, organic resins such as polyvinyl alcohol, polyurethanes, and styrene-butadiene latex, and thermosets such as epoxies, urea-formaldehyde resins, melamine-formaldehyde resins, and polyamide-polyamine epichlorohydrin resins. Cellulose, in all its forms and modifications, appears to be quite desirable structure forming agent because it volatilizes completely at relatively low temperatures with little ash formation and is unreactive toward other components in the preform.

The structure forming agent is present in the preform at a range from about 2 to about 90 weight percent. The minimum amount of structure forming agent is that which is necessary to give a stable preform, that is, one which can be handled, shaped, and so forth, an amount which depends upon fiber loading, fiber size, and so forth. The amount of structure forming agent present in the preform will influence the void volume of the final composite, with a higher structure forming agent content affording a higher void volume, hence the structure forming agent can be used as one independent variable to control this property. We have previously noted that where two metal fibers are used with different fiber sizes, the amount of the smaller sized fiber also may be used to vary void volume and pore size. Using cellulose as a structure forming agent with carbon fibers and stainless steel fibers as an example, a range from about 10 to about 60 weight percent of cellulose in the preform is typical.

After the dispersion of fibers, optional components, and structure forming agent in a liquid is attained, the solids are collected, as on a mat. Excess liquid may be removed, such as by pressing, and the resulting solid dispersion often is dried (i.e., liquid is removed), especially where it is to be stored prior to further treatment. Where a thermosetting structure forming agent is used, the temperature of drying is important. But in the more usual case there is nothing particularly critical in the drying process, and drying may be performed in air, under elevated temperatures, or in a flowing gas. The mass also may be compacted under pressure to a greater or lesser extent to effect void volume; the greater the compaction, the lower will be the void volume. This affords a third independent means of controlling void volume in the final composite. [A fourth independent means of controlling the void volume and pore size can be effected by altering the tensile properties and aspect ratios of the fibers used. A fifth means of controlling void volume involves the application of pressure during, e.g., sintering, or any other bonding procedure which may be employed.]

The dispersion may be cast into a predetermined shape prior to, coincident with, or after drying, with the last named procedure the one most commonly employed. The preform resulting from drying is generally quite flexible and adaptable to shapes of various sorts. Often it is quite convenient to cast the dispersion into sheets which can then be rolled up and stored prior to being treated to effect bonding. The sheets can be stored for long periods of time, can themselves be cast into near net-shaped bodies, and can be used for onsite bonding procedures for the fabrication of various articles. Various types of preform sheets may be stacked upon one another prior to any treatment to effect bonding in order to create thicker composites containing spatially graded compositions, graded porosities, nonconductive separator functions, etc. Alternatively, different shaped preform sheets may be stacked so as to form both two and three dimensional structures for various applications. Metal containing preforms can be, e.g., sintered onto thin metal foils which serve as electrolyte barriers in the case of bipolar electrode assemblies, or the metal foil may be omitted in the case of flow-through geometries. More complex flow patterns and geometries are also obtainable as cellulose-containing preform sheets can be shaped and glued into "corrugated cardboard" like structures prior to bonding treatment and have been shown to retain their shapes after such treatment.

The preform or the cast dispersion is treated principally to effect bonding of at least the first fiber junctions. The method used to effect bonding often has the important secondary or ancillary effect of removing the structure forming agent and the remainder of the liquid medium. The removal of the structure forming agent and the remainder of the liquid medium may be a second and discrete step which either precedes or succeeds bonding. For economy of exposition we will subsequently treat methods of bonding as effecting concurrent removal of the structure forming agent and remaining liquid, although it needs to be explicity recognized that this is not necessarily the case.

Among the methods which may be used to bond at least the first fibers at their junctions may be mentioned heating, electroforming, electroplating, and various chemical reactions; the more complete exposition of bonding methods given earlier should be consulted. At least where bonding of metal junctions is sought to be effected, heating is the most effective bonding method and also has the desirable attribute of simultaneously effecting removal of some types of organic structure forming agents and the remaining liquid. Heating produces sintering of metal-metal junctions and also ceramic-ceramic junctions, but is not necessarily effective with other fibrous material. Another useful bonding method which may be employed is electroplating. Other methods of bonding have been described earlier.

In the preparation of carbon fiber-metal fiber composites, heating the preform to effect sintering or fusion of metal-metal junctions is the final stage in composite fabrication. The preform is heated under conditions effecting sintering of the metals to provide a network of fused metal fibers. Fusion of the metal fibers at their points of contact rigidly locks the carbon fibers in place to afford a rigid structure by defining a matrix of carbon fibers intertwined and interlocked in a network of metal fibers with the structural rigidity arising from a multiplicity of fused points at the contact sites of metal fibers. Sintering typically is done in a gas containing hydrogen at a partial pressure which is about 5 times the partial pressure of water in the gas stream, the water typically arising from the binder and from oxides on the surface of the metal. At the temperature of metal fusion the metal also usually promotes gasification of carbon via its reaction with hydrogen to afford methane. Consequently sintering preferably is performed at a high temperature for a short time to promote metal fusion relative to carbon gasification. It is desired that sintering be accompanied by loss of less than about 25% by weight of the carbon fibers via gasification, preferably under about 15%, and even more preferably under about 5 weight percent loss. Although the nature of the materials in the preform are important to determine the particular fusion conditions, the relative amounts of these materials are less important. The optimum sintering temperature can be routinely determined by the skilled worker in this field through simple experimentation. For example, where a carbon fiber-stainless steel composite is obtained through a preform with cellulose as a binder it has been determined that fusion temperatures from about 1000° C. to about 1200° C. for a period from 2.5 minutes to 3 hours is optimum in an atmosphere of $H_2$ at 101 KPa. It may be noted in passing that controlled void formation is a consequence of binder volatilization.

It needs to be appreciated that although the foregoing temperatures provide a workable range, the properties and composition depend on the sintering time and temperature. Sintering at 1200° C. for 5 minutes produces an electrode material very different than one formed using the same preform and sintering at 1000° C. for 3 hours. Depending on the specific application, either one might be considered optimal. Certainly the corrosion resistance of the metal and the metal/carbon ratio are greatly affected by the sintering conditions shown.

Structure forming agents generally will be removed via methods which will include volatilization (e.g., sublimation, evaporation, oxidation to gaseous materials), carbonization, other chemical reactions affording volatile products (or gasification generally), acid or caustic leaching, and dissolution, whether dissolution of the structure forming agent per se or of secondary products resulting from chemical degradation or transformation of the structure forming agent. Volatilization as by heating in a suitable atmosphere is the most general method of structure forming agent removal and is highly favored in the practice of our invention. As noted above, the structure forming agent is removed at least to the extent of 90%, in the more usual case at least 95% is removed, and often at least 99% is removed.

The foregoing description was couched in terms of a structure forming agent which was largely subsequently removed. In another large class of composites the structure forming agent need not be largely removed, and sometimes its removal is undesirable. For example, one may employ as a structure forming agent a polymer which subsequently undergoes carbonization but not volatilization. The resulting composite is then a network of bonded fibers in a graphitic matrix. As another example, in appropriate circumstances it is possible to have a solvated metal salt as a structure forming agent, which is later reduced to lock the structure together. What is important to recognize is that however important may be the class of structure forming agents which are largely removed by subsequent treatment it is not the sole class of structure forming agents which may be used in the practice of our invention.

As stated at the outset, the properties of our carbon fiber-metal fiber composites may be varied over rather wide ranges. The surface area of the composite depends upon the amount of carbon present as well as the surface area of the carbon fibers used in its preparation. It is desirable to have a composite with a high surface area where the composite is used as an electrode, but with a low surface area where the composite is used for electromagnetic shielding. The surface area of the final composite may range from about 0.001 $m^2/g$ to at least 1350 $m^2/g$. In the general field of electrochemistry, the most interesting range of surface areas is from about 50 to about 1350 $m^2/g$, especially the range 250–1000 $m^2/g$. The void volume of the composite determines its ability, when used as an electrode, to accommodate solid precipitates without affecting electrode surface area, and the ability to provide good heat and mass transfer. Void volume, as mentioned above, may be adjusted by the amount of the binder used, as well as the diameter of the binder fibers and the application of pressure during sintering. Clearly this is under the control of the investigator who then has the capability of fabricating composites with that set of properties desired for a specific application.

In the case of bipolar electrodes, required for liquid double layer capacitors, $Li/SOCl_2$ cathodes and $H_2/H_3PO_4/O_2$ fuel cells, preform materials are placed on both sides of a thin metal foil and sintered, as described earlier, so that the metal fibers lock the high surface area carbon fibers to both sides of the electrode foil. The metal foil serves as an electrolyte barrier and an electrode base for connecting external contacts. Metal fibers and the electrode base may be fabricated from the same material, although dissimilar metals can be used provided highly adherent and sinter-bonded contacts can be formed.

As stated earlier, the composites of our invention have a multiplicity of diverse uses in addition to that of an electrode. For example, the composite paper preforms can be stacked and sintered with varying pore sizes, void volumes, etc., so as to form tailored filter materials. These filter materials can be wrapped around an appropriate mandrel so that near net shape properties are obtained upon sintering. There does not appear to be any major limitation on the fiber materials which are used. The independent adjustment of pore size and void volume would help to make, e.g., stainless steel filters, which provide long lifetimes and lower pressure drops prior to plugging.

Superconducting magnetic separators, with appropriate screen materials, are routinely used in the minerals beneficiation industry to remove magnetic ores and particulates from nonmagnetic crudes. The force which attracts the magnetic particulate depends upon a number of factors one of which is the magnitude of the magnetic field gradient at the magnetic screen. Material holdup and retention, and clogging prior to demagnetization with shaking and rinsing also are design criteria.

In the past, methods have not existed for making screen materials with independent optimization of void volume, pore size and fiber diameter. Fiber diameter is important since the radius of the wire and holes or voids in the resultant mesh control the magnetic field gradient. Currently, 400 grade stainless steels with appropriate magnetic properties are employed in these screens, but fibers below 10 or 20 $\mu$m are generally not used since the screen or mesh which is formed plugs easily due to the formation of small voids and/or becomes weak when small diameter materials are employed if the voids are kept large (viz., low density materials).

Our process (i) is directly applicable to 400-grade stainless steels, (ii) can be used to achieve relatively independent control of void volume and pore volume, (iii) can fuse small diameter loose fibers into networks that are not available as freestanding starting materials, (iv) can be used to form layered/stacked sheets for graded porosities and enhanced performance and (v) can utilize mixtures of both large and small diameter fibers. The latter approach would permit larger fibers to be used for structural support while zones of high magnetic flux gradient could be created adjacent to these members using smaller diameter materials. Indeed, the possibilities here seem endless.

In the case of bipolar electrodes, required for liquid double layer capacitors, $Li/SOCl_2$ cathodes, and $H_2/H_3PO_4/O_2$ fuel cells, preform materials are placed on both sides of a thin metal foil and sintered, as described earlier, so that the metal fibers lock the high surface area carbon fibers to both sides of the electrode foil. The metal foil serves as an electrolyte barrier and an electrode base for connecting external contacts. Metal fibers and the electrode base may be fabricated from the same material, although dissimilar metals can be used provided highly adherent and sinter-bonded contacts can be formed.

The experimental description and results which follow only illustrate this invention and are representative of the methods which may be used and the results which may be obtained, but should not be considered as limiting the invention in any way.

EXPERIMENTAL

The following description is representative of the preparation of the composites prepared within. Differences in materials, conditions, etc., will be indicated for the individual composites where appropriate.

Materials-The constituent materials employed during composite preparation included carbon fibers from Charcoal Cloth, Ltd., 316L stainless steel fibers from Bekaert Steel Wire Corp. and/or National Standard, cellulose fibers as a mixture of soft and hard woods, and 316L stainless steel foils from Arnold Engineering. Individual carbon fibers were 2-3 microns in diameter but were used in the form of 10 micron diameter bundles up to 5 mm in length containing ca. 30 individual fibers. Cellulose fibers were 20-30 microns in diameter and varied in length from 100 to 1000 microns. The stainless steel foils were 5 microns in thickness.

Fiber preparation-Before the various fiber materials could be combined into a paper preform, the carbon and stainless steel fibers required separation and dispersion into a slurry for easy mixing with other materials. In raw form, the carbon fibers were bundled and twisted into strands and woven into charcoal cloth. The "cloth" was dismantled into strands, then cut into 0.5 cm sections to allow for dispersion of individual fiber bundles in water. "As received" stainless steel fibers were coated with polyvinyl alcohol (PVA) type Mowiol 4-88, which was utilized during sizing and cutting prior to shipment. PVA was removed by repeated rinsing of these fibers in distilled water.

Formation of paper preform-Since physical mixtures of the fibers are not mechanically stable, cellulose fibers were employed as a structure forming agent in the preparation of paper preforms. The paper preforms used in composite preparation were processed according to TAPPI Standard 205 using Noran equipment. The pretreated fibers along with cellulose fibers were agitated at 50 Hz in 1 liter of water for five to twenty minutes. The dispersed fiber mixture was then collected on a sheet mold (200 cm$^2$) to form the wet paper composite preform. The preform was pressed at ca. 400 kN/m$^2$ and allowed to dry in air at room temperature.

Figure 2:
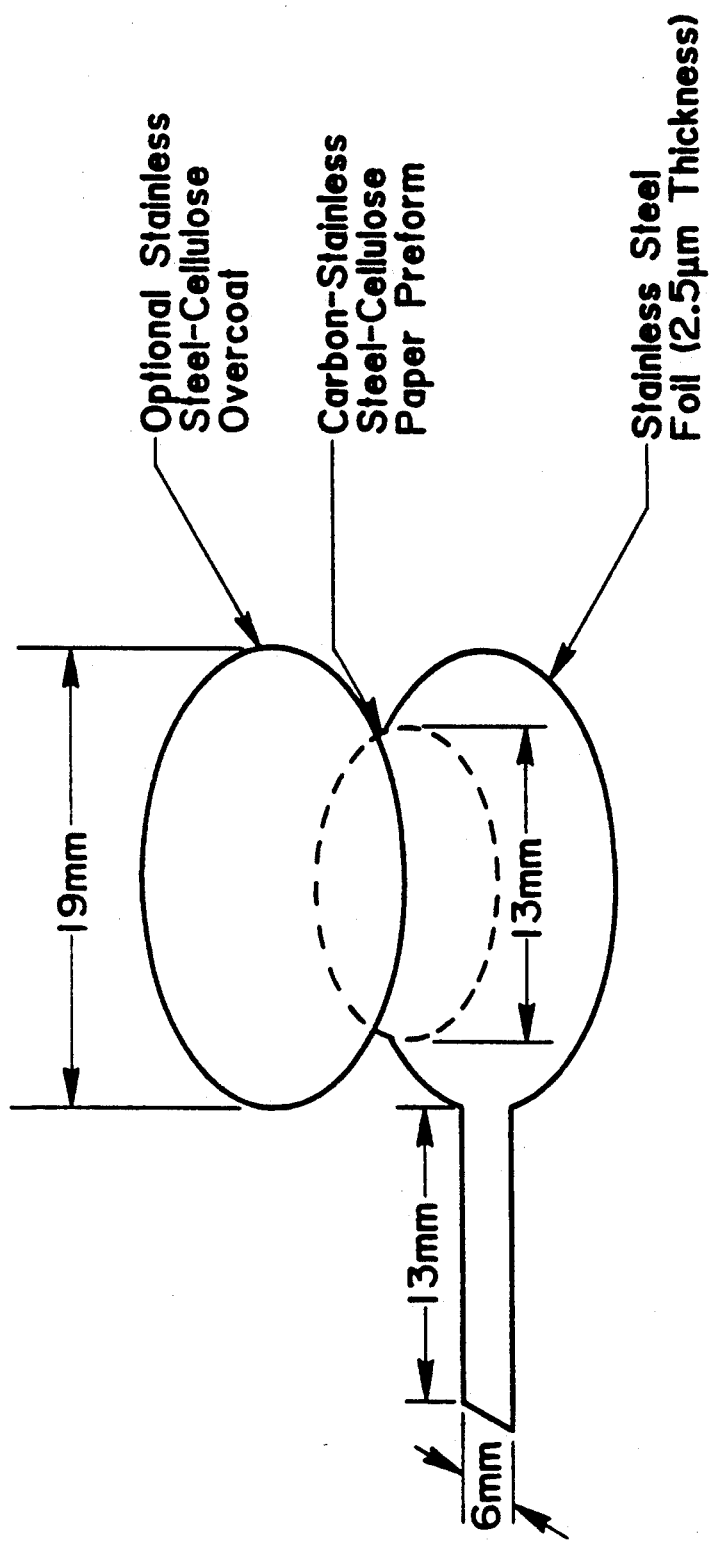
FIG. 2 depicts the assembly of paper preforms into electrode preforms prior to sintering.

Assembly of electrode preforms-The first fiber-second fiber-cellulose composite papers (i.e., paper preforms) and stainless steel foils were cut into circular disks with diameters of 13 and 19 mm respectively, and assembled by layers. In most cases, an optional 19 mm diameter sheet of stainless steel-cellulose paper preform was placed on top of each side of the composite structure to serve as a protective layer, as shown in FIG. 2.

Sintering of electrode preforms-The layered electrode preform was placed between two quartz plates (20 × 30 mm), which were held in place by a quartz clip. The sample was placed in a controlled atmosphere quartz U-tube reactor (25 mm diameter) for heat treatment. The sintering reactor was equipped with flexible gas lines to facilitate movement of the reactor into and out of the vertical sintering furnace (Heviduty, 10 A, 1150 W). Sintering was performed in a reducing atmosphere of $H_2$ with a flow rate of 10-100 cc/min (STP) and total pressure of 101 kPa. Gases were supplied by Liquid Air with purities of 99.995% for $H_2$. Gas flow was monitored using a Linde Model FM-4550 flow controller.

The feed gas mixture was passed over Cu turnings at ca. 500K. to remove background $CO$, $CO_2$, $O_2$ and $H_2O$ and then passed through a molecular sieve trap immersed in a liquid $N_2$ trap to further remove background condensibles. The sintering reactor was passivated with feed gas for a minimum of three hours prior to reaction. The sintering furnace was preheated to 1423K. prior to beginning each experiment. The reactor was then introduced into the furnace causing a rapid cooling of the furnace to ca. 1400K. The experimental temperature was typically reached in 5-7 min followed by sintering at the desired temperature. The sintering reactor was quenched by rapidly removing it from the furnace.

Sample analysis-The amount of carbon retained in the carbon fiber-stainless steel fiber composite electrode after sintering was estimated from weight change measurements. These measurements were obtained on a Sartorius Model R 160 D semimicro balance with a precision of 0.02 mg.

Volumetric $N_2$ B.E.T. surface area measurements were performed to determine whether the high surface area characteristics of the carbon had been retained. Measurements were taken of virgin charcoal cloth before paper perform preparation and of composite electrodes after sintering. The B.E.T. apparatus employed was a high-vacuum Pyrex design with a base pressure of $4*10^{-2}$ Pa. To minimize background impurities, high-vacuum greaseless stopcocks (Ace Glass) were used to manipulate gas storage and dosage. Experimental pressures were monitored within 1.3 Pa using a Texas Instruments precision manometer (Model 145) employing a fused-quartz Bourdon capsule. Samples were pretreated by heating in vacuum at 473 K. for a minimum of 2 hrs to remove species such as water from the sample. For each experiment performed, a minimum of four data points were collected over the pressure range of 5.1 to 30 kPa.

The surface compositions of stainless steel foils in the sintered composite were determined using X-ray photoelectron spectroscopy (XPS). XPS analysis was performed using a Leybold-Heraeus LHS-10 spectrometer utilizing MgKα X-rays. The sample was exposed to air for ca. 100 hours before measurements were performed, allowing the surface to oxidize. Analysis was performed at 300 K. under a vacuum of $1.3*10^{-6}$ Pa. Surface compositions were calculated on the basis of measured peak area ratios normalized with respect to the appropriate cross sections, inelastic electron escape depths, and spectrometer sensitivity factors.

Scanning electron microscopy (SEM) was utilized to observe the degree of intermixing of the constituent fibers and sintering behavior. SEM micrographs were collected on an ISI Model 5540 scanning electron microscope at 5 kV beam energy.

EXAMPLE 1

CARBON RETENTION AT VARIOUS SINTERING CONDITIONS

Preforms were made from stainless steel fibers 2 microns in diameter and 2 mm in length, and the aforedescribed carbon and cellulose fibers under the general preparative conditions stated above. The air-dried preforms were heated at the temperatures of Table I to determine carbon retention and sintering degree.

The amount of carbon retained in the sintered composite matrix was determined by weight change measurements with the assumption that the metal weight would not change during sintering and that all cellulose would be converted to gaseous products. Separate experiments verified that the weight of retained cellulose after exposure to hydrogen at 1323 K. was negligible. At these conditions, the weight change of stainless steel was not detectable. Based on carbon retention measurements, "optimal sintering" determined by the percentage of initial carbon remaining in the sintered electrode, was achieved at 1423 K. in $H_2$ for 2.5 minutes. Gas flow of the $H_2$ was maintained at 10 cc/min (STP) with a total pressure of 101 kPa. For these optimal sintering conditions, carbon retentions of >98% were attained. Results of selected sintering experiments are shown in Table I.

TABLE I

| | Carbon Retention as a Function of Sintering Conditions | | | |
|---|---|---|---|---|
| Experiment | Temperature (K) | Time (min) | Percentage of Initial Carbon Retained (%) | Degree of Sintering |
| A | 1323 | 10 | 97.3 | G |
| B | 1323 | 5 | ND | NS |
| C | 1373 | 5 | 97.5 | G |
| D | 1373 | 2.5 | ND | NS |
| E | 1423 | 2.5 | 98.3 | G |
| F | 1423 | 1.5 | ND | NS |

G - Good, appeared structurally stable
ND - Not Determined
NS - Not Sintered, no structural integrity B.E.T. surface area-Of equal importance to the retention of carbon is the requirement that carbon retains its high surface area structure after sintering. Volumetric B.E.T. measurements showed a surface area of ca. 760 $m^2$/gm of carbon for the sintered composite electrode structure compared to ca. 790 $m^2$/gm for virgin charcoal cloth.

Surface composition-XPS measurements of stainless steel foils that had undergone sintering at the conditions of Experiment F in Table I showed that iron was the most abundant metallic surface species. The surface abundance of iron, chromium, and nickel were investigated. The peak shapes and locations obtained are consistent with those reported for iron (+3) oxide ($Fe_2O_3$) and chromium (+3) oxide ($Cr_2O_3$) (21). $Fe_2O_3$ was found to be 1.8 times more plentiful than $Cr_2O_3$ on the surface. No nickel oxide (NiO) was detected. Results for the bulk and surface compositions of sintered 316L stainless steel foils are presented in Table II.

TABLE II

| Bulk and Surface Composition of Stainless Steel Type 316L Foil. | | | |
|---|---|---|---|
| | Bulk Compostion (atomic %) | Surface[1] Composition (atomic %) | Heat of Sublimation (kJ/mol) |
| Chromium | 17 | 35 | 396 |
| Iron | 71 | 65 | 416 |
| Nickel | 12 | ND | 429 |

ND - Not Detected by XPS
[1]Based on observed metal content only

Figure 3:
FIG. 3 is an electronmicrograph of a stainless steel-cellulose composite paper before sintering, where the stainless steel fibers are 2 microns in diameter.
Figure 4:
FIG. 4 is an electronmicrograph of a stainless steel-carbon-cellulose composite paper before sintering; stainless steel fibers are 2 microns in diameter.

Composite matrix structure-The degree of intermixing of the fibers in the composite electrode matrix was investigated using SEM. FIGS. 3 and 4 show micrographs of the stainless steel-cellulose and stainless steel-carbon-cellulose composite paper preforms, respectively, prior to sintering. The degree of intertwining of the metal and the carbon fibers in the two paper preforms is clearly shown in the micrographs.

Figure 5:
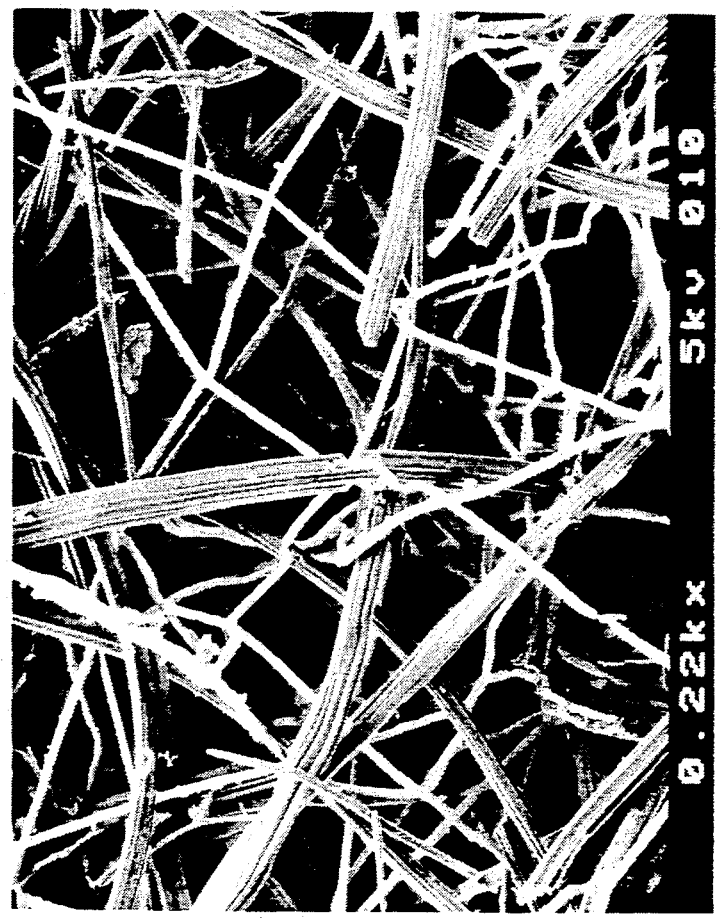
FIG. 5 is an electronmicrograph of the stainless steel-carbon composite matrix after sintering the composite paper of FIG. 4 at conditions of Experiment E in Table I.
Figure 6:
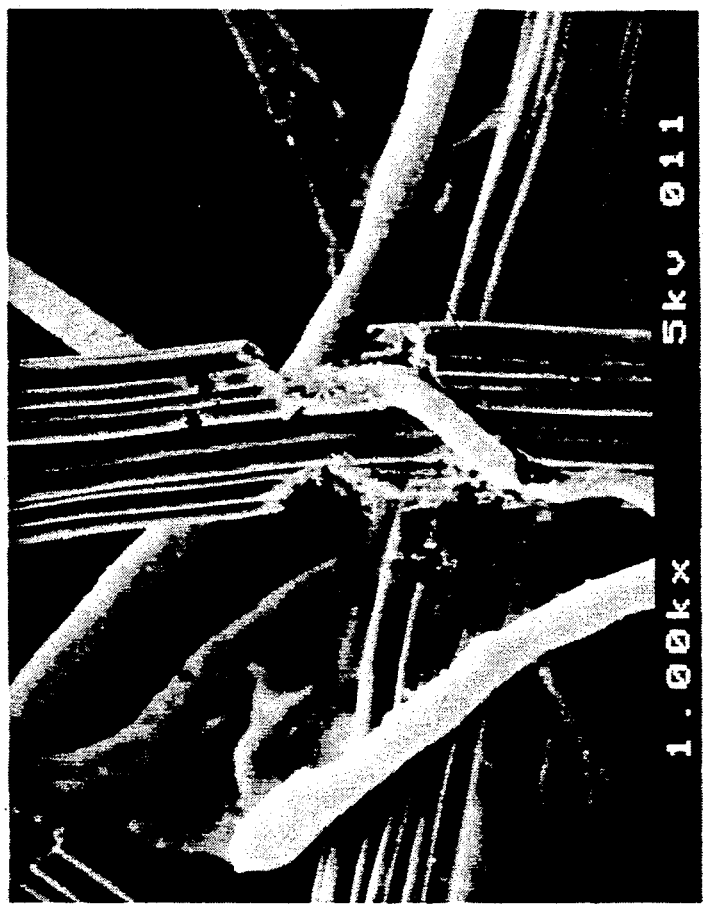
FIG. 6 is an electronmicrograph of the stainless steel-carbon composite of FIG. 5 at higher magnification showing intimate contacting of metal and carbon fibers after sintering.
Figure 7:
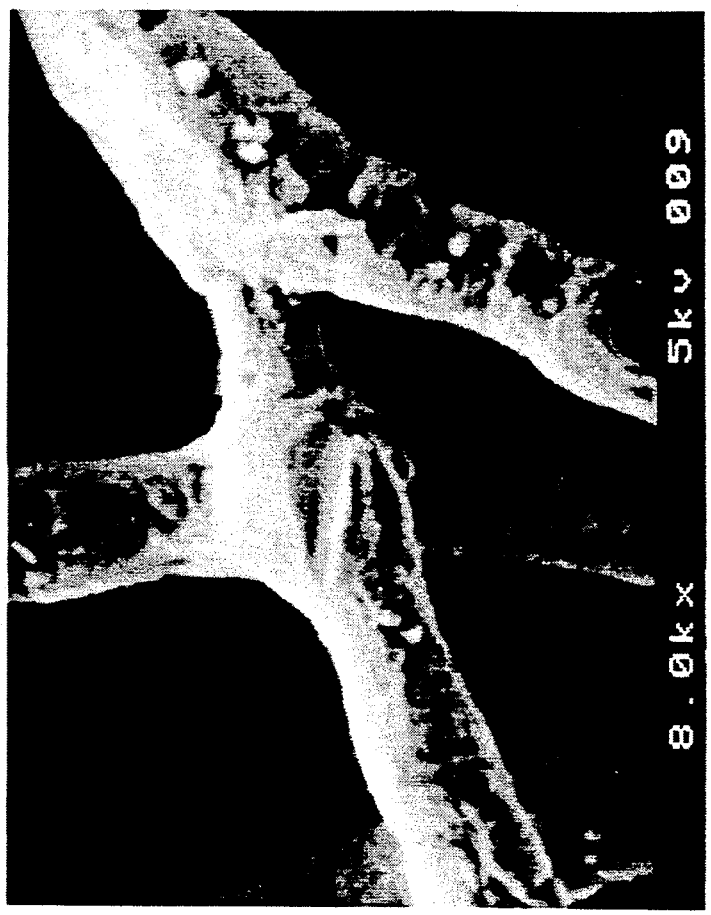
FIG. 7 is an electronmicrograph at still higher magnification of a metal-metal joint after sintering.

FIG. 5 shows the metal-carbon composite matrix after sintering following the conditions of Experiment E in Table I. No cellulose appears in the structure and the intertwined and interlocked framework of the sintered composite is evident. The intimate contacting of stainless steel and carbon fibers can be seen in FIG. 6. FIG. 7 shows the degree of metal-metal sintering which occurs in the sintered matrix. This sintering appears responsible for the electrode's outstanding structural integrity and electrical conductivity.

EXAMPLE 2

A mixed-fiber composite was made from 2 μm diameter and 0.5 μm diameter 316 stainless steel (ss) fibers combined in equal weight fractions. The length of the 2 μm fibers added to the preform were 5 mm, the length of 0.5 μm fibers were ca. 100 μm. Electrodes were prepared by casting a 16 cm diameter, circular preform sheet, using 0.5 g of 2 μm diameter 316 stainless steel fibers, 0.5 g of 0.5 μm diameter 316 stainless steel fibers, and 0.5 g of cellulose fibers. The fibers were mixed at 50 Hz agitation in 1 liter of water prior to settling onto a filtration screen. The preform sheet was pressed at 400 $kN/m^2$, dried in air for >24 hours and sinter bonded at 1323K for 20 minutes in 101 kPa of $H_2$.

EXAMPLE 3

Figure 8:
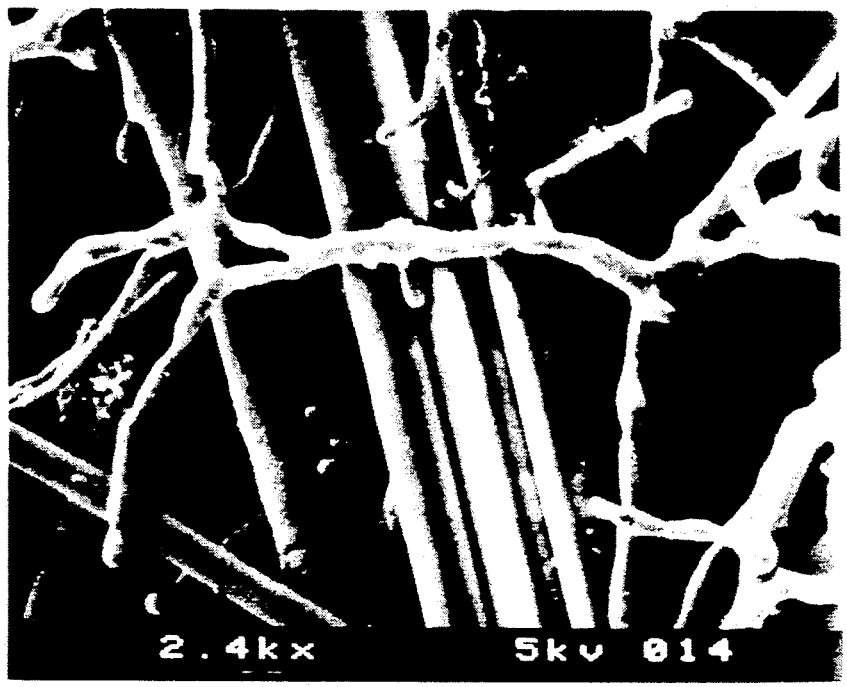
FIG. 8 is an electronmicrograph of a metal fiber composite entrapping fibers of 95% alumina-5% silica; see Example 2.

The electrode of FIG. 8 was prepared by casting a 16 cm diameter circular preform sheet, 0.5 g of 2 μm diameter 316 stainless steel fibers, 0.5 g of 0.5 μm diameter 316 stainless steel fibers, 0.5 g of cellulose fibers and 0.5 g of a commercially available alumina-silica fiber, Saffil, obtained from ICI Chemicals. Saffil is 95% alumina and 5% silica, and fibers are 3±1 μm in diameter with a surface area of 150 $m^2$/g. The length of the 2 μm steel fibers was 5 mm, the length of the 0.5 μm ss fibers was 100 μm. The fibers were mixed at 50 Hz agitation in 1 liter of water prior to settling onto a filtration screen.

The preform sheet was pressed at 400 kN/m², dried in air for >24 hours and sinter bonded at 1323K for 20 minutes in 101 kPa of pure $H_2$.

EXAMPLE 4

Figure 9:
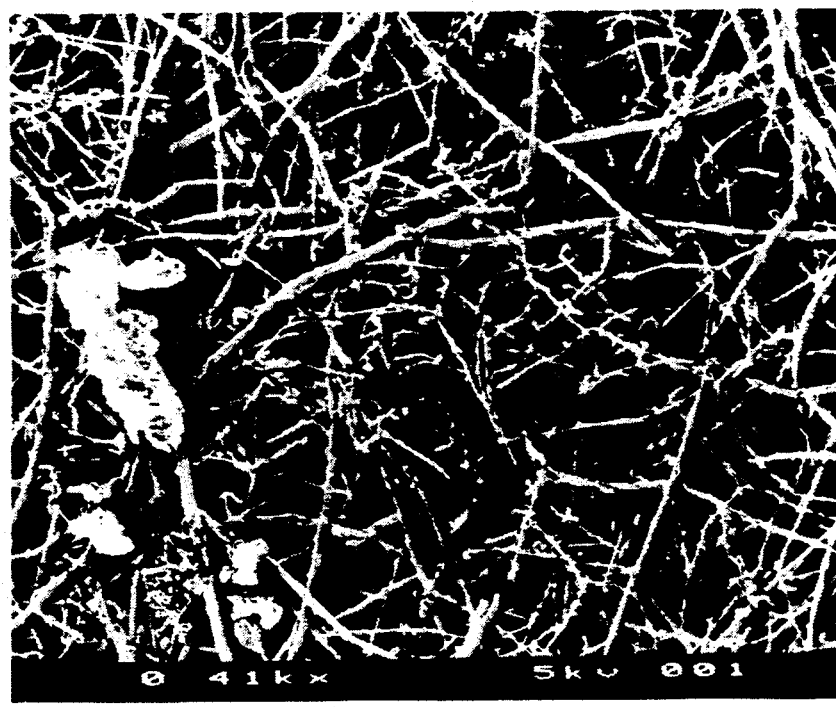
FIG. 9 is an electronmicrograph of a metal fiber composite with an entrapped mica platelet and kaolinite particles chemically attached to the stainless steel fibers; see Example 4.

The composite of FIG. 9 was prepared by casting a 16 cm diameter circular preform sheet using 0.5 g of 2 μm diameter 316 stainless steel fibers, 0.5 g of 0.5 μm diameter 316 stainless steel fibers, 0.5 g of cellulose fibers, and 0.5 g of a filler clay for fibers (Kaolinite with mica particles; Hi White, available from Huber Clays Inc.) The length of the 2 μm ss fibers was 5 mm, the length of the 0.5 μm ss fibers was 100 μm. The preform sheet, prepared as described in the earlier examples, was pressed at 400 kN/m², dried in air for >24 hours and sinter bonded at 1323K for 20 minutes in 101 kPa of pure $H_2$.

EXAMPLE 5

Figure 10:
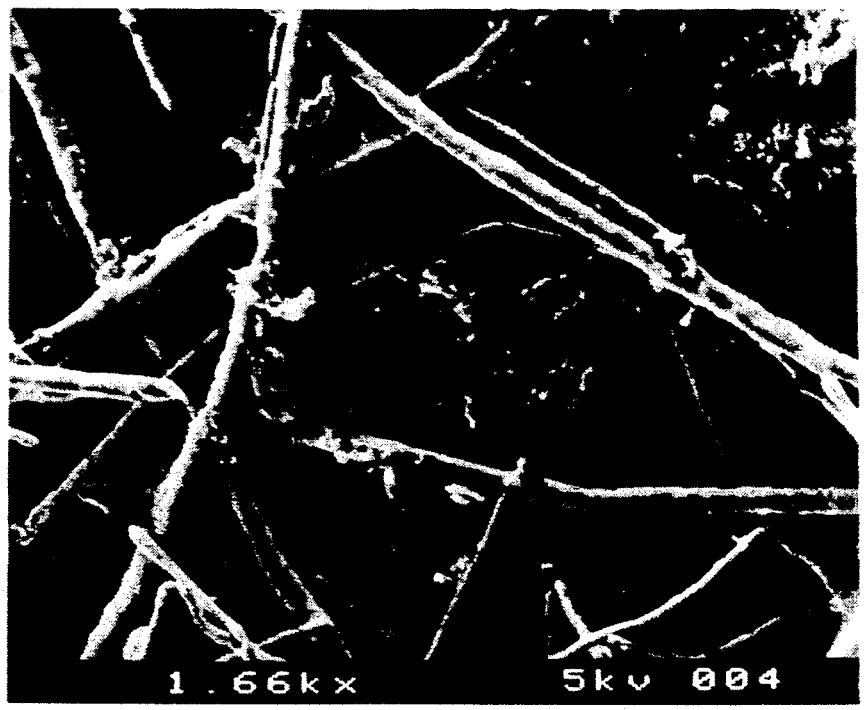
FIG. 10 is the same sample at higher magnification.
Figure 11:
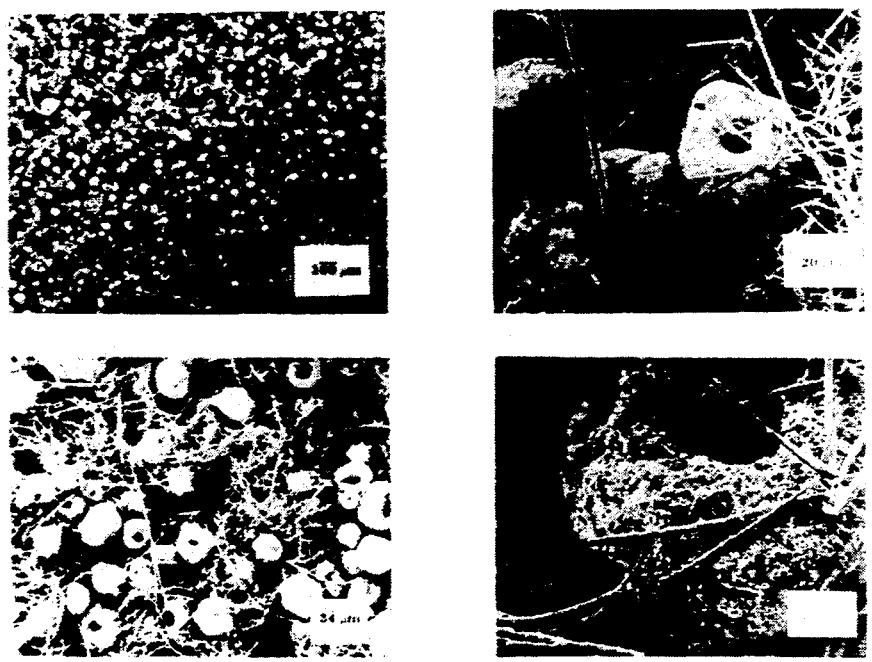
FIG. 11 is an electronmicrograph of a composite of metal fibers with two different diameters having entrapped within the network a biosupport.
Figure 12:
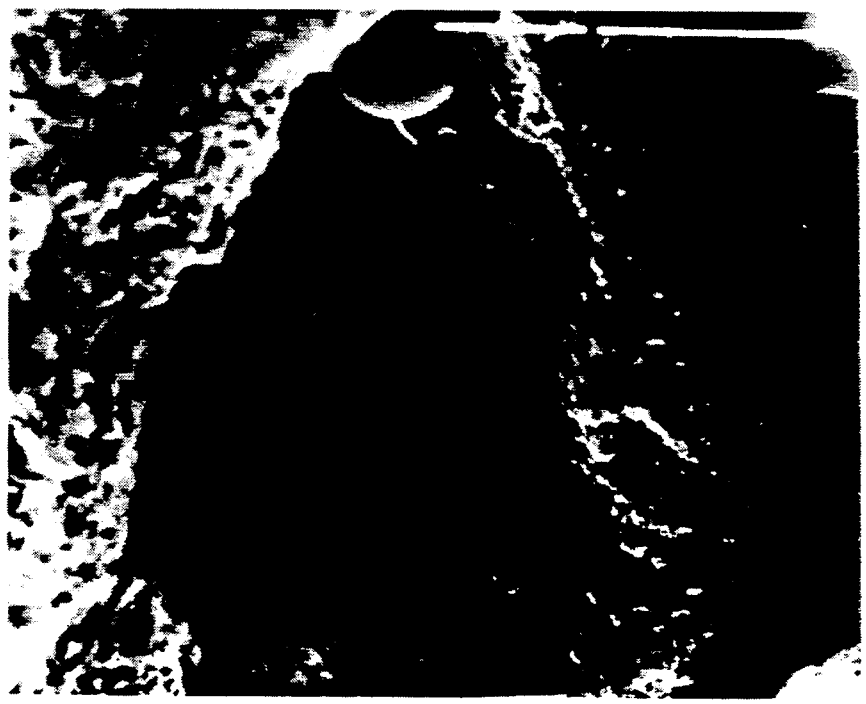
FIG. 12 is an electronmicrograph of the same composite which has been impregnated with growing cells; see Example 5.

The composite of FIGS. 10 and 11 were prepared by casting a 16 cm diameter, circular preform sheet, using 0.5 g of 2 μm diameter 316 stainless steel fibers, 1.0 g of 0.5 μm diameter 316 stainless steel fibers, 2.0 g of cellulose fibers and 2.5 g of a commercially available biosupport of calcined mullite known as Biofix available from English China Clays. The length of the 2 μm ss fibers was 5 mm, the length of the 0.5 μm ss fibers was 100 μm. The liquid used was water combined with a cationic retention aid obtained from Betz Paper Chemicals which assisted the biosupport in associating with the cellulose fibers while in an aqueous solution. The preform sheet was prepared, pressed, dried, and sintered as described in the prior example. FIG. 12 is an electronmicrograph of material prepared by circulating a solution containing yeast cells through the composite described above. The cells shown in the Figure have become entrapped within the matrix and the resulting composite can now be used, for example, as an enzyme reactor, or for fermentation employing a steady-state cell population.

EXAMPLE 6

A composite was prepared by casting a 16 cm diameter circular preform sheet, using 0.5 g of 2 μm diameter 316 stainless steel fibers, 1.0 g of 2 μm diameter carbon fibers and 0.5 g of cellulose fibers. The length of the 2 μm ss fibers was 5 mm. The carbon fibers were cut to a length of 5 mm and had a surface area of ca. 800 m²g. These fibers were left in the form of ca. 10 μm bundles containing ca. 30 fibers per bundle. The preform sheet was prepared, pressed, dried, and sintered as described in the prior example.

EXAMPLE 7

A composite was prepared by casting a 16 cm diameter circular preform sheet, using 0.5 g of 0.5 μm diameter 316 stainless steel fibers, 1.0 g of 2 μm diameter carbon fibers described in the prior example, and 0.5 g of cellulose fibers. The length of the 0.5 μm ss fibers was 1000 μm. The preform sheet was prepared, pressed, dried, and sintered as described in the prior example.

EXAMPLE 8

A commercially available electrode material, Protech, available from Electrosynthesis Inc. of East Amherst, N.Y., was purchased as a 24 mg/cm² sheet containing 10 weight percent supported Pt crystallites and a porous Teflon separator material as a backing and used as the commercial reference.

Our material labeled as "Composite" was prepared by casting a 16 cm diameter, circular preform sheet, using 1.0 g of 2 μm diameter 316 stainless steel fibers, 1.0 g of 2 μm diameter carbon fibers and 0.5 g of cellulose fibers. The length of the 2 μm ss fibers was 5 mm. The preform sheet was prepared, pressed, dried, and sintered as described in the prior example.

Figure 13:
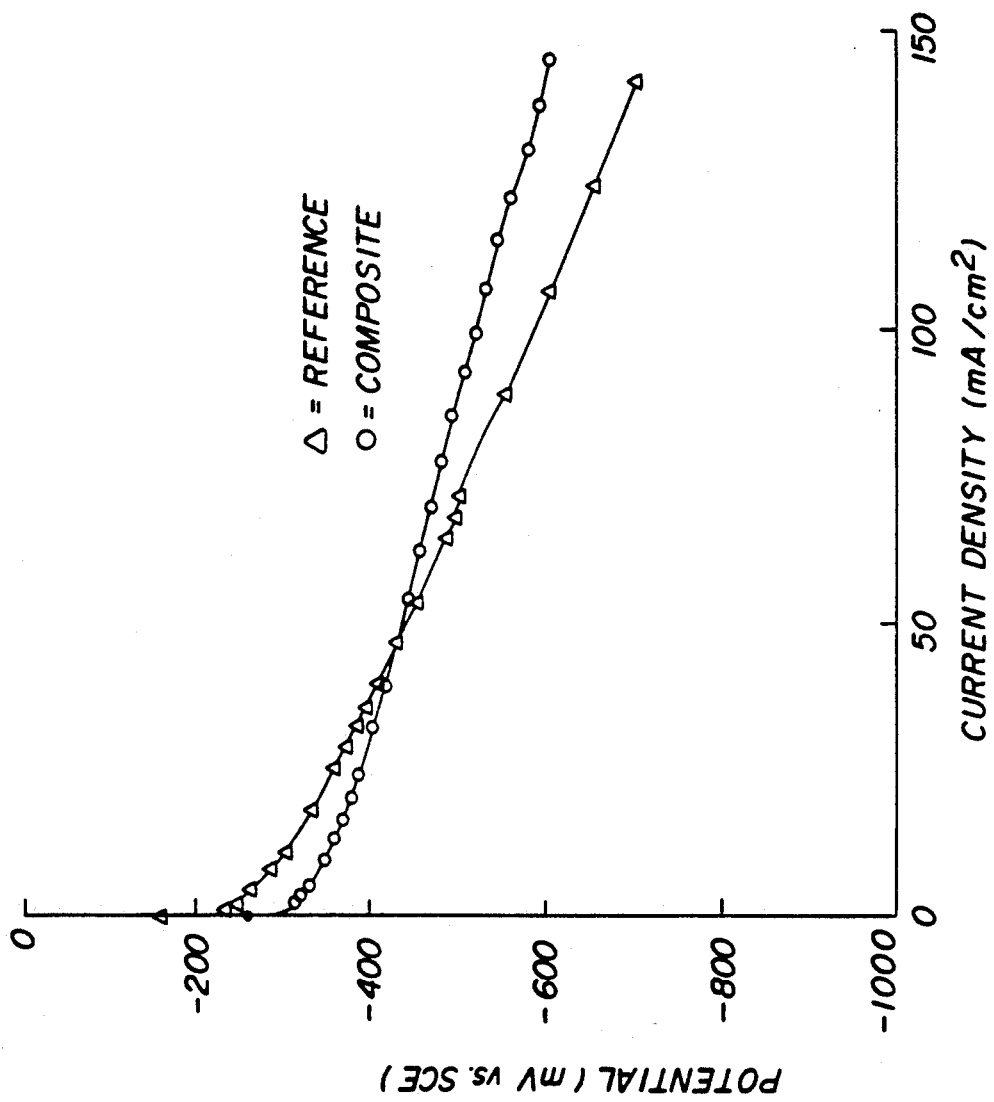
FIG. 13 shows polarization curves for the reduction of oxygen in an alkaline fuel cell; see Example 8.

To produce the electrode of FIG. 13, one piece of the preform sheet prepared above was cut into a 1.3 cm diameter circular piece and sandwiched between two 1.9 cm diameter pieces of a masking and protective preform which contained only stainless steel and cellulose fibers. The sheet for the protective preform was prepared identically to the preform sheet for the active layer except that the carbon fiber bundles were omitted and the mass of stainless steel fibers and cellulose fibers per sheet were both 0.5 g. The resulting stack of three sandwiched preform pieces was sinter bonded at 1323K for 30 minutes in 101 kPa of pure $H_2$ to afford an article of density 16 mg/cm² which contained no Pt. The stainless steel layers on each side of the electrode served as a protective layer to protect the carbon-containing layer from any type of mechanical abrasion.

The data of FIG. 13 are a comparison of polarization data between our electrode and the commercial product. At low current densities the commercial product is superior. However, at higher current densities our electrode shows less polarization losses, even though our material does not contain Pt. The open structure of our material permits greater mass transport than the commercial material. The low void volume and porosity of the commercial product does not allow its active Pt materials to participate in the reaction at high reaction rates, whereas the inherent activity of the carbon, when accessible, is more than enough to overcome the presence of Pt at high reaction rates, as demonstrated by our electrode material.

EXAMPLE 9

The material described in Example 6 was subsequently electroplated with Ni from a $NiSO_4$-$6H_2O$ solution at the indicated current densities and times. The 21 weight percent carbon in the sintered electrode, rather than the expected 67% from the preform composition, reflects the fact that the preform was sintered onto a 316 ss foil and that some of the carbon was gasified during sintering. Performance data are summarized in Table III.

TABLE III

| Nickel Electrodeposition into Composite Electrode | | |
| --- | --- | --- |
| Amount of Carbon in Composite electrode: | 0.00582 gm (20% carbon by weight) | |
| Geometric Electrode area: | 1.27 cm² | |
| Plating Solution: | 0.2 M $NiSO_4.6H_2O$ | |
| Counter Electrode: | Platinum mesh | |
| Reference electrode: | SCE | |
| Applied Current Density (mA/cm²) | Time Held (mins) | Double Layer Capacitance (F/g) |
| — | — | 1.79 |
| 27.6 | 10 | 2.61 |
| 55.1 | 5 | 2.80 |
| 78.7 | 5 | 2.90 |
| 157.5 | 6.7 | 2.85 |
| 236.0 | 6.7 | 0.395 |
| 275.0 | 6.7 | 0.347 |

The column marked "Double Layer Capacitance" is based on the weight of carbon only and does not include contributions from the ss foil or ss fibers. The increasing values in this column indicate how electrodeposition initially causes greater contact between carbon and ss, while at higher current densities and longer times the decrease is due to a blockage of the active material by a nickel overlayer, with a sharp decrease in capacitance occurring at an applied current density over about 160 mA/cm$^2$. Overall, this material maintains its high and accessible surface area at 15 to 27 times higher current densities than current commercial cathodes.

What is claimed is:

1. A method of making a composite comprising the steps of forming a dispersion comprising carbon fibers, metal fibers, and cellulose in an unreactive liquid medium, collecting the resulting wet dispersion, removing the unreactive liquid medium from the wet dispersion to afford a dried preform, heating the dried preform in an atmosphere containing hydrogen at a temperature effective to volatilize at least 90 weight percent of the cellulose and fuse the metal fibers, with a weight loss of under about 25 weight percent of carbon fibers, and recovering the resultant composite.

2. The method of claim 1 where the metal fiber is selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, magnesium, manganese, gallium, and combinations thereof.

3. The method of claim 1 where the metal fiber is an alloy.

4. The method of claim 3 where the alloy is selected from the group consisting of constantan, hastelloy, nichrome, inconel, monel, carpenter's metal, steels, and non-steel iron alloys.

5. The method of claim 4 where the alloy is a stainless steel.

6. The method of claim 1 where the cellulose is at least 95% weight percent volatilized.

7. The method of claim 6 where the cellulose is at least 99 weight percent volatilized.

8. The method of claim 1 where under about 15 weight percent of the carbon fibers are lost.

9. The method of claim 8 where under about 5 weight percent of the carbon fibers are lost.

10. The method of claim 1 where the cellulose is at least 99 weight percent volatilized at temperatures sufficient to fuse the metal fibers with a loss of less than about 25 weight percent carbon fibers.

11. The method of claim 1 where the cellulose is at least 99 weight percent volatilized at temperatures sufficient to fuse the metal fibers with a loss of less than about 5 weight percent carbon fibers.

12. A method of making an article having a network of a first fiber and at least one second fiber, where at least said first fiber has a plurality of bonded junctions at the first fiber crossing points and said second fiber is interlocked in the network of bonded first fibers, said method comprising the steps of forming a dispersion in an unreactive liquid, said dispersion comprising the first and the second fibers, and at least one structure forming agent selected from the group consisting of cellulose, polyvinyl alcohol, polyurethanes, styrene-butadiene latex, epoxy resins, urea-formaldehyde resins, and polyamide-polyamine epichlorohydrin resins, collecting a wet dispersion, removing the unreactive liquid from the wet dispersion to afford a preform, treating the preform to effect bonding of at least the first fibers at a plurality of the first fiber junctions, removing at least 90 weight percent of the structure forming agent, and recovering the article.

13. The method of claim 12 where the first fiber is a metal and the second fiber is selected from the group consisting of a metal, a ceramic, a high surface area material with a surface area from 1.5 to about 1500 square meters per gram, carbon, or any combination thereof.

14. The method of claim 13 where the second fiber has a surface area from 1.5 to about 1500 square meters per gram and is selected from the group consisting of silica, carbon, magnesia, alumina, titania, aluminosilicates, aluminophosphates, and silicaaluminophosphates.

15. The method of claim 14 where the second fiber is impregnated with a third metal, said third metal selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, magnesium, manganese, and gallium.

16. The method of claim 13 where the second fiber has a surface area of at least 50 square meters per gram.

17. The method of claim 13 where each of first and second fibers in a metal and where each fiber is:
  1) a metal selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, magnesium, manganese, and gallium.
  2) any combination of said foregoing metals;
  3) an alloy of at least two of said metals; or
  4) any combination of said metals and said alloys.

18. The method of claim 17 where the second fiber has a diameter from about 0.001 to about 1000 times that of the first fiber.

19. The method of claim 17 where the second fiber has an aspect ratio between about 10 and about 10,000.

20. The method of claim 17 where the second fiber is present at a weight ratio of from about 0.001 to about 100 that of the first fiber.

21. The method of claim 13 where the second fiber is a ceramic selected from the group consisting of the oxides, carbides, and nitrides of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, magnesium, manganese, and gallium and mixtures thereof.

22. The method of claim 12 where at least the first fiber is electroplated.

23. The method of claim 12 where at least the first fiber has a conductive coating.

24. The method of claim 12 where the first fiber is a metal and the second fiber has a surface area of from 1.5 to about 1500 square meters per gram.

25. The method of claim 24 where the second fiber is selected from the group consisting of silica, carbon, magnesia, alumina, titania, aluminosilicates, aluminophosphates, and silicaaluminophosphates.

26. The method of claim 12 where the preform is treated so as to remove at least 95 percent of the structure forming agent.

27. The method of claim 12 where the procedure of treating the preform to effect bonding is selected from the group consisting of heating, electroforming, electroplating, chemical vapor deposition, and reactive plasma spraying.

28. The method of claim 12 further wherein said preform is compacted under pressure prior to being treated to effect bonding.

29. The method of claim 12 where the first fiber is:
1) a metal selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, and gallium.
2) any combination of said foregoing metals;
3) an alloy of at least two of said metals; or
4) any combination of said metals and said alloys.

* * * * *